(12) United States Patent
Gokan (10) Patent No.: US 6,959,683 B2
(45) Date of Patent: Nov. 1, 2005

(54) CRANKSHAFT FOR AN INTERNAL COMBUSTION ENGINE

(75) Inventor: Yoshitsuga Gokan, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/782,546

(22) Filed: Feb. 19, 2004

(65) Prior Publication Data

US 2004/0187637 A1 Sep. 30, 2004

(30) Foreign Application Priority Data

Mar. 6, 2003 (JP) .......................................... 2003-059769
Mar. 18, 2003 (JP) .......................................... 2003-074457

(51) Int. Cl.$^7$ .............................................. F02B 75/06
(52) U.S. Cl. ..................................... 123/192.1; 74/603
(58) Field of Search ............................ 123/192.2, 192.1; 74/603

(56) References Cited

U.S. PATENT DOCUMENTS 3,748,925 A * 7/1973 Stewart ........................ 74/603

FOREIGN PATENT DOCUMENTS

JP            58091917 A  *  6/1983  ............. F16C/3/06

OTHER PUBLICATIONS

WO 91/16530, Atkin et al., Oct. 31, 1991.*

* cited by examiner

Primary Examiner—Noah P. Kamen
(74) Attorney, Agent, or Firm—Carrier, Blackman & Associates, P.C.; William D. Blackman; Joseph P. Carrier (57) ABSTRACT

A crankshaft has a helical drive gear formed as one of the crank webs at an end portion thereof. Another crank web outside of the drive gear is made in two parts, an integral balance weight mounting portion and a removable balance weight. In one embodiment, a crankshaft 12 features a crankshaft body 33 including a gear 24 for outputting rotation formed on one side of a crankpin 17d. The crankshaft also includes a first balance weight mounting portion 30g formed on the other side of the crankpin 17d and a first balance weight 31g to be mounted to the first balance weight mounting portion 30g. The crankshaft body 33 may be formed with a second balance weight mounting portion 30a separately from the first balance weight mounting portion 30g, and a second balance weight 31a mounted to the second balance weight mounting portion.

14 Claims, 7 Drawing Sheets

CRANKSHAFT FOR AN INTERNAL COMBUSTION ENGINE

CROSS-REFERENCE TO RELATED APPLICATIONS

The present application claims priority under 35 USC 119 based on Japanese patent application No. 2003-074457, filed Mar. 6, 2003, and also claims priority based on Japanese patent application No. 2003-059769, filed Mar. 18, 2003.

BACKGROUND OF THE INVENTION

1. Field of the Invention

The present invention relates to a crankshaft for an internal combustion engine. More particularly, the present invention relates to a crankshaft including a crank web configured as a helical drive gear, and also including a two-piece crank web including a removable annular weight.

2. Description of the Background Art

Many different designs for internal combustion engines are known, and many different engines are commercially available. In a motorcycle engine, for example, a piston is reciprocated by heat energy obtained by burning an air-fuel mixture. Reciprocal motion of the piston is converted, via a connecting rod, to rotary motion of the crankshaft.

It has been known to form a crankshaft used in a motorcycle engine with an integral spur gear formed on the crankshaft at one side of a crankpin. This known crankshaft is formed with a balance weight mounted on the crankshaft at the other side of the crankpin (see, for example, the crankshaft disclosed in Japanese published patent document JP-A-8-93746).

In the known crankshaft described in Japanese published patent document JP-A-8-93746, a crank web is divided into two main parts, i.e., an integral balance weight mounting portion and a removable balance weight. The balance weight is made removable in order to avoid interference with a machining tool used for forming the gear on one side of the crankpin during manufacture.

In other words, in the design of the known crankshaft, the balance weight mounting portion is formed in a size which can avoid interference with the machining tool when machining the gear, so that the gear is formed by machining at the first balance weight mounting portion, while avoiding interference with the machining tool. After the gear has been machined, the balance weight is then mounted to the balance weight mounting portion.

In the known crankshaft described above, although one of the crank webs is configured as a spur gear, variations of load exerted on each tooth are significant, and operation of the gear may be noisy.

Moreover, since it is generally necessary to match an inertia moment of the crankshaft to respective engines having different properties, in the known crankshaft including the structure described above, it is difficult to share the crankshaft among a plurality of engine types. However, if it were possible to share a crankshaft among a plurality of engine types, the overall cost could be significantly reduced.

Although the known crankshafts have some utility for their intended purposes, a need still exists in the art for an improved crankshaft for an engine. In particular, there is a need for a crankshaft, including an integrally formed drive gear on a crank web thereof, which exhibits superior performance to that obtained with a spur gear.

Further, there is a need for an improved crankshaft that may be adapted to be used in any one of a plurality of engines, so that cost savings and reduction in component numbers may be attained.

SUMMARY OF THE INVENTION

The present invention provides an improved crankshaft for an internal combustion engine, in which a primary drive gear, which is a helical gear, is provided by a modified crank web of the crankshaft. The crankshaft hereof also includes a split crank web, which is connected to the primary drive gear via a crankpin. Optionally, the crankshaft may include a second split crank web at an end opposite the first split crank web, to allow for greater flexibility in use.

The helical gear provided on the crank web of the crankshaft is high in intermeshing rate, and experiences less variation in load exerted on each tooth than a spur gear, whereby mechanical noise may be reduced, and smooth power transmission can be achieved.

When the gear provided on the crank web is a helical gear, grinding of helical teeth may be skewed by the helix angle of a tooth trace, and as a result, the crank webs on both sides of the gear need not be made smaller than the bottom diameter of the helical gear.

The invention according to a particular embodiment hereof is a crankshaft (for example, a crankshaft 12 in one exemplary illustrative embodiment) having a crankshaft body (for example, a crankshaft body 33 in the embodiment) including a gear (for example, a primary drive gear 24 in the embodiment) formed on a crank web disposed on one side of a crankpin (for example, a crankpin 17d in the embodiment).

The crankshaft according to the particular embodiment includes structure for supporting a connecting rod (for example, a connecting rod 18d in the embodiment) to be connected to a piston (for example, a piston 19d in the embodiment). The crankshaft 12 also includes a first balance weight mounting portion (for example, a first balance weight mounting portion 30g in the embodiment) formed in the other side of the crankpin, and a first balance weight (for example, a first balance weight 31g in the embodiment) for attaching to the first balance weight mounting portion.

The crankshaft according to the described embodiment may, optionally, be formed with a second balance weight mounting portion (for example, a second balance weight mounting portion 30a in the embodiment) separate from the first balance weight mounting portion, and a second weight (for example, a second balance weight 31a in the embodiment) mounted to the second balance weight mounting portion.

In this manner, utilizing the structure in which a crank web is divided into the first balance weight mounting portion and the first balance weight to allow for machining the gear while avoiding interference with the machining tool, for example, for a plurality of engine types having different properties, the first balance weight to be mounted to the first balance weight mounting portion is selected to adjust an inertia moment, and the second balance weight to be provided on the separate second balance weight mounting portion is also selected to correspond to the first balance weight, for balancing the crankshaft in the axial direction. Accordingly, the crankshaft can be mounted to any one of a variety of engine types, by changing the first balance weight and the second balance weight.

Another aspect of a crankshaft according to the present invention is characterized in that the first balance weight mounting portion is provided on the crankshaft body at one side of the crankpin (for example, a crankpin 17d in the embodiment) located at one end out of a plurality of crankpins, and the second balance weight mounting portion may be provided beside a crankpin (for example, a crankpin 17a in the embodiment) located at the other end of the crankshaft from the first balance weight mounting portion.

In this manner, since the first balance weight mounting portion is provided on the outside of the crankpin located at one end out of the plurality of crankpins and the second balance weight mounting portion is provided on the outside of the crankpin located at the other end, the first balance weight mounting portion and the second balance weight mounting portion are well balanced in terms of position, and thus when changing the first balance weight and the second balance weight, they can be set relatively easily.

In another aspect hereof, the invention is characterized in that the main drive gear formed on the crankshaft is a helical gear.

In this manner, although meshing noise of the gear can be reduced, and hence quietness may be improved by employing the helical gear as the main drive gear, since it is necessary to incline the machining tool with respect to the gear for machining the helical gear, and hence probability of interference with the crank web which is located on the opposite side of the crankpin from the gear increases, the structure in which the crank web is divided into the first balance weight mounting portion and the first balance weight, as described above, is further effective.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 6:
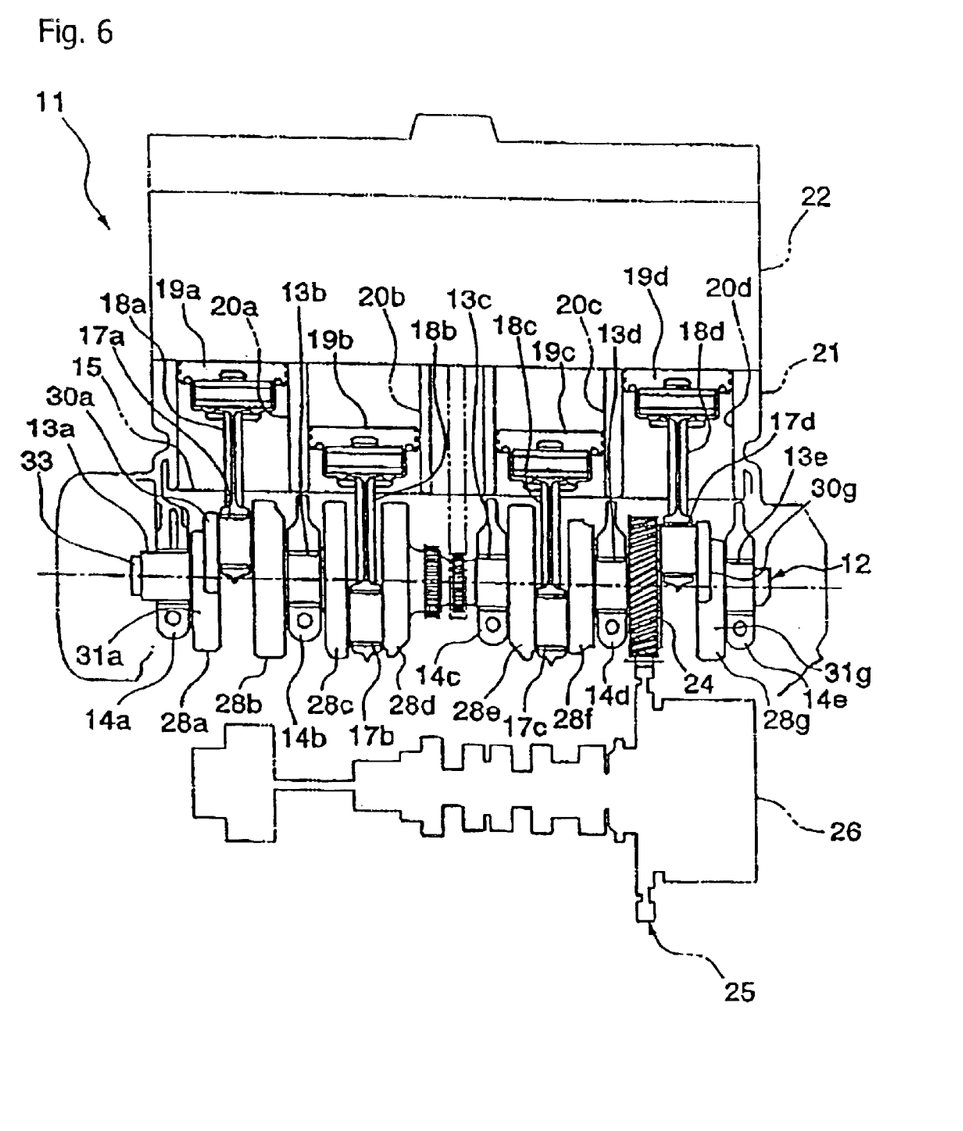
FIG. 6 is a simplified plan view generally showing the internal structure of an engine containing a crankshaft according to a second embodiment of the present invention, and showing the outline of a transmission in phantom.

FIG. 6 of the drawings shows generally the internal structure of an engine 11 to which a crankshaft according to the embodiment may be applied, and more specifically, the engine 11 according to the depicted embodiment is an in-line four-cylinder engine for motorcycles.

Referring now to FIGS. 1–5, a first illustrative embodiment of a crankshaft 1 according to the present invention will now be described.

Figure 1:
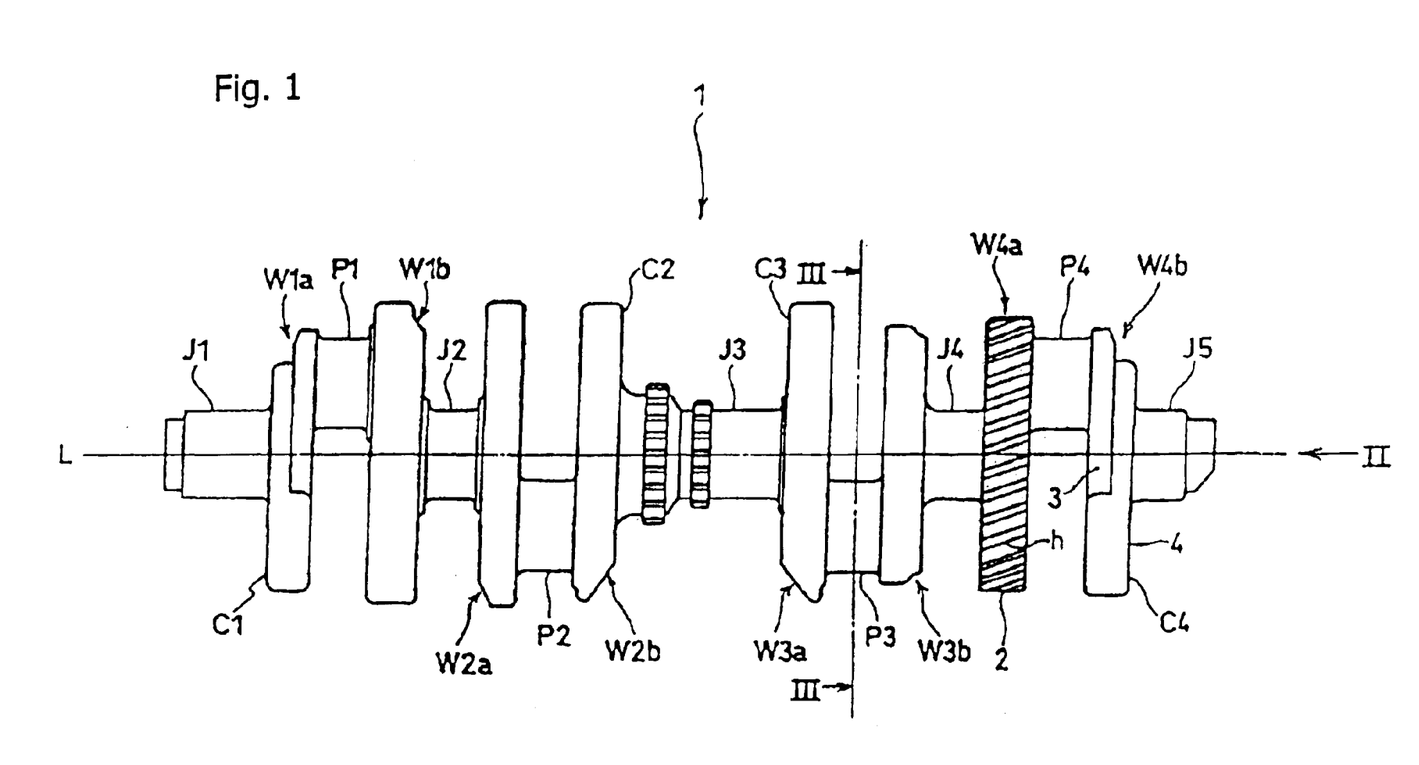
FIG. 1 is a front plan view of a crankshaft according to a first embodiment of the invention.

A crankshaft 1 according to the first embodiment is applied, for example, to a four-cycle parallel four-cylinder internal combustion engine for a motorcycle, and the general front view of the crankshaft 1 is shown in FIG. 1.

Referring to FIG. 1, the crankshaft 1 includes, from the left, five crank journals J1, J2, J3, J4, J5, which are parts of the revolving shaft, including both ends along the axis of rotation L. The crankshaft 1 is also provided with crankpins P1, P2, P3, P4, which are provided to supportingly receive the pistons via the connecting rods. The crankpins P1, P2, P3, P4 are situated between the four adjacent crank journals J1, J2, J3, J4, J5, and are non-axially located, so as to be displaced from the axis of rotation L.

Crank webs W1a, W1b on both sides of the crankpin P1 connect the crankpin P1 and the crank journals J1, J2. Crank webs W2a, W2b on both sides of the crankpin P2 connect the crankpin P2 and the crank journals J2, J3. Crank webs W3a, W3b on both sides of the crankpin P3 connect the crankpin P3 and the crank journals J3, J4, and crank webs W4a, W4b on both sides of the crankpin P4 connect the crankpin P4 and the crank journals J4, J5.

The crankshaft 1, generally configured as described above, may be integrally molded by forging or casting as a whole, with the exception of supplemental crank webs which function as balance weights, as will be further described herein.

The crank web W4a connecting the crankpin P4 and the crank journal J4 is uniquely configured, and is ground with helical teeth h formed integrally therearound on the outer peripheral surface thereof. As a result, the crank web W4a, by itself, serves as a primary drive gear 2, which is a helical gear. The helical teeth h have a helix angle of about 30 degrees.

When the crankshaft 1 is assembled together with other components of the engine and transmission, the primary drive gear 2 meshes with a primary driven gear (not shown) fixed to an outer portion of a clutch provided at the end of the main shaft of the transmission. The primary drive gear 2 therefore transmits rotation of the crankshaft 1 to the transmission via the clutch.

Figure 2:
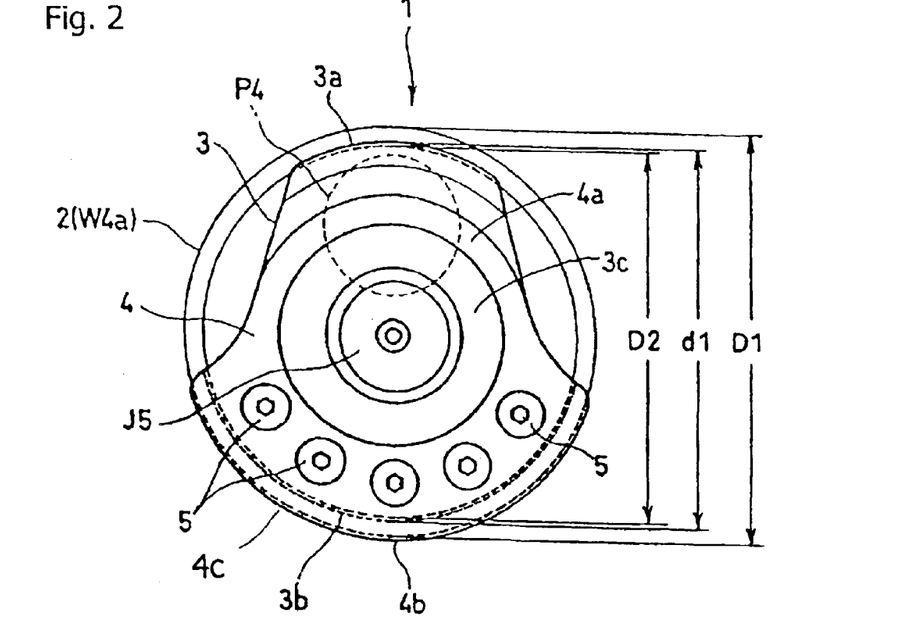
FIG. 2 is a side view of the crankshaft of FIG. 1, taken in the direction indicated by an arrow II therein.
Figure 3:
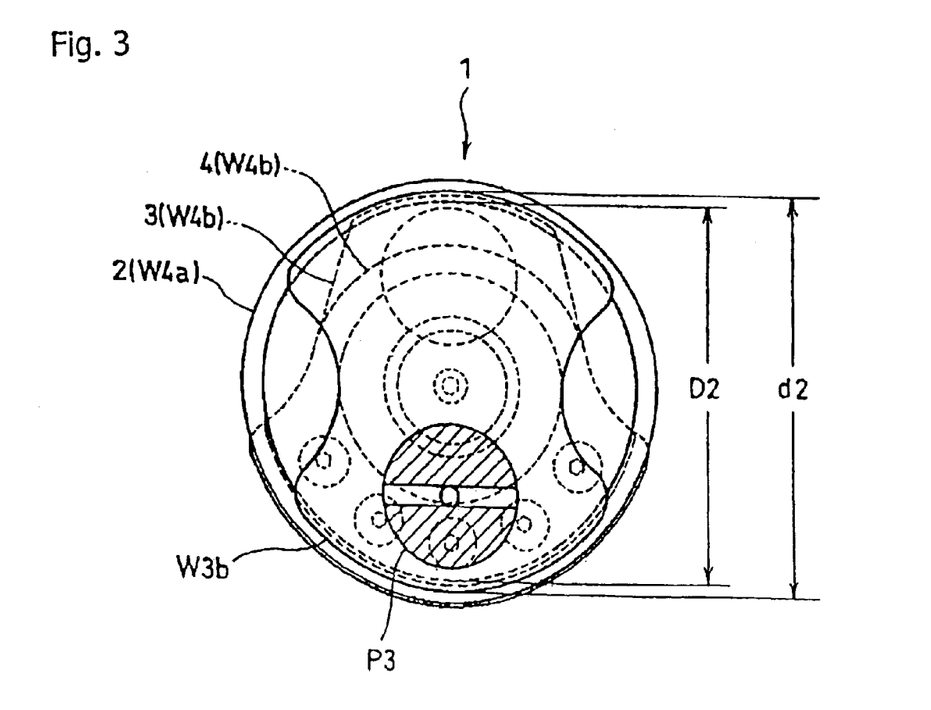
FIG. 3 is a cross-sectional and partial plan view of the crankshaft of FIG. 1, taken along the line III—III therein.

Referring now to FIGS. 2–3, it will be seen that the outside diameter (maximum diameter) of the helical teeth h of the primary drive gear 2 is represented by D1, and the (smaller) diameter of the primary drive gear 2, at the bottom portions of the teeth h, is represented by D2.

The crank webs W1a, W2b, W3a, W4b are provide with counterweights C1, C2, C3, C4 on the opposite sides of the axis of rotation L from the sides on which the crankpins P1, P2, P3, P4 are held.

In particular, the crank webs W1a, W4b on both ends are formed by combining a separate supplemental crank web with a main crank web which is formed integrally with the crankshaft body.

Figure 4:
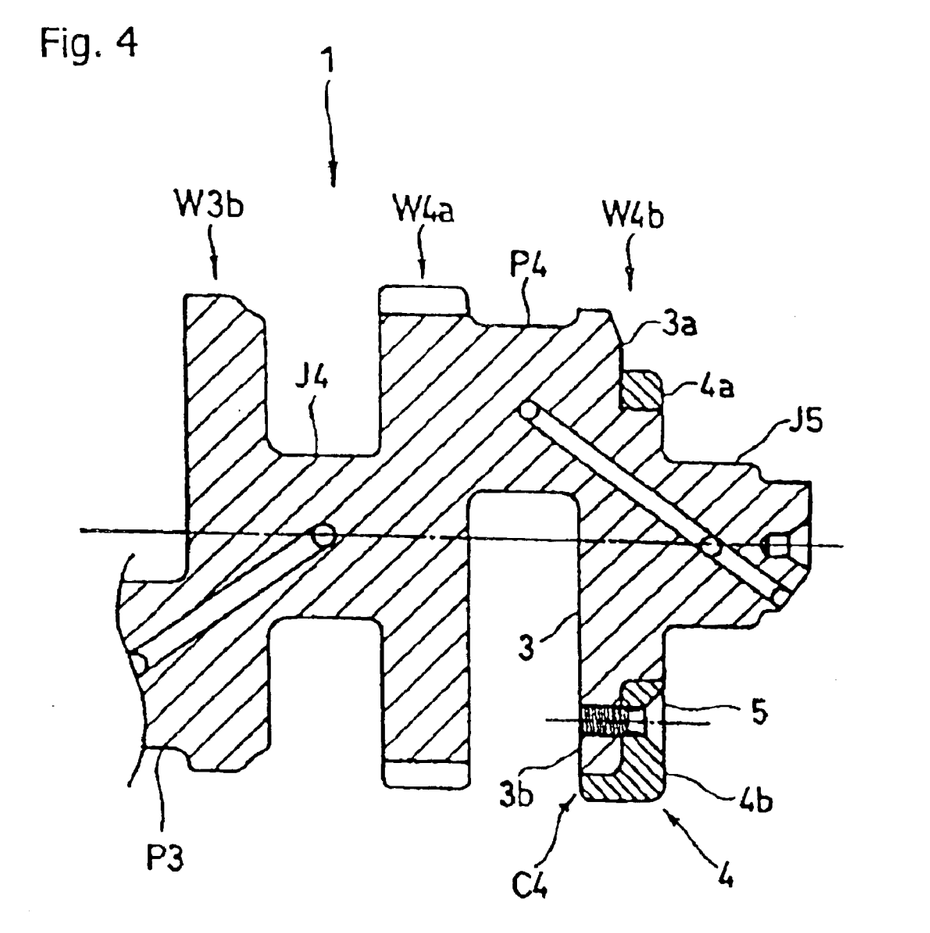
FIG. 4 is a longitudinal cross-sectional view of a principal right hand portion of the crankshaft of FIG. 1.

Both of the outer end crank webs W1b, W4b have the same two-part structure, and the crank web W4b, next to the primary drive gear 2, will be described based on FIG. 3 to FIG. 5. It will be understood that the crank web W1a, on the opposite end of the crankshaft, has a corresponding structure.

When viewed from the side, as illustrated in FIG. 2, the main crank web body 3 of the crank web W4b has an outline shaped like an axe head, formed by cutting two substantially almond-shaped portions out of a disk of d1 in diameter (See FIG. 2). The main crank web body 3 has a narrower developed portion 3a and a wider developed portion 3b so the overall weight distribution will be symmetrical with respect to the axis of rotation L. The narrower developed portion 3a is formed with the crankpin P4 so as to project therefrom, and the wider developed portion 3b constitutes part of the counterweight C4.

Figure 5:
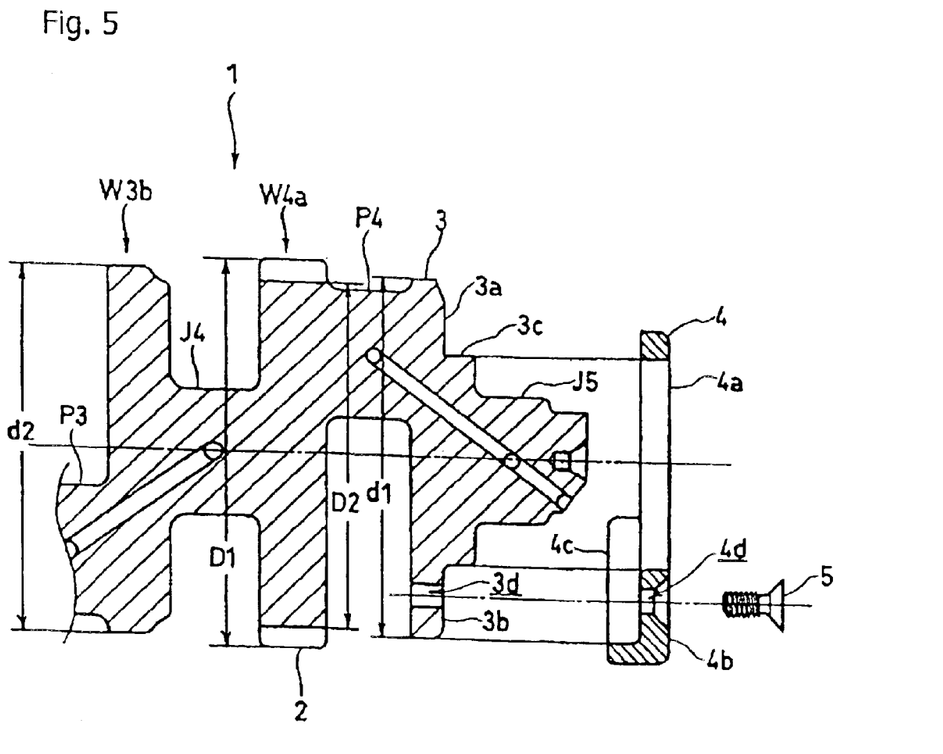
FIG. 5 is an exploded longitudinal cross-sectional view of the principal right hand portion of the crankshaft of FIGS. 1 and 4.

As shown in FIG. 5, the outer diameter d1 of the main crank web body 3 is larger than the tooth-bottom diameter D2 of the adjacent primary drive gear 2, and smaller than the outside diameter D1 thereof. In other words, the relation with respect to the outer diameter d1 of the main crank web body 3 is expressed by the expression, D2<d1<D1.

The wider developed portion 3b is formed with five screw holes 3d formed therein, spaced at regular intervals along the outer peripheral edge thereof on the same diameter.

As best seen in FIG. 5, the center portion of the main crank web body 3 is formed with a medium diameter column 3c projected outwardly thereon, and the crank journal J5, of small diameter, extends integrally outwardly from the medium diameter column 3c.

On the other hand, a supplemental crank web 4 includes an annular portion 4a having a cylindrical hole formed therein to receive the column 3c. The annular portion 4a has an outer diameter smaller than the outer diameter d1 of the main crank web body 3, and an inner diameter which is only incrementally larger than the diameter of the medium diameter column 3c, to allow the supplemental crank web to fit over the column 3c.

The supplemental crank web 4 also includes a developed portion 4b formed by extending a half of the annular portion 4a in the radial direction and widening into a fan-shape, and an arcuate portion 4c protruding in the axial direction along the outer peripheral edge of the developed portion 4b.

The developed portion 4b of the supplemental crank web 4 has the same shape as the wider developed portion 3b of the main crank web body 3, and the outer diameter thereof is slightly larger than the wider developed portion 3b.

The developed portion 4b is formed with five insertion holes 4d formed therein and spaced apart, as shown, with the outer portions of the holes being countersunk and trimmed in a conical shape. The position and spacing of the holes 4d corresponds to the five screw holes 3d of the wider developed portion 3b of the main crank web body 3.

The axial width of the protrusion of the arcuate portion 4c is almost the same as the width of the wider developed portion 3b of the main crank web body 3. The inner diameter of the arcuate portion 4c is the same as the outer diameter d1 of the main crank web body 3, and the outer diameter of the arcuate portion 4c is larger than the maximum diameter D1 of the primary drive gear 2.

Therefore, when combining the supplemental crank web 4 with the main crank web body 3, by fitting the annular portion 4a of the supplemental crank web 4 over the medium column portion 3c of the main crank web body 3, the arcuate portion 4c of the supplemental crank web 4 covers the outer periphery of the wider developed portion 3b of the main crank web body 3.

Then, hexagon socket head screws 5 are inserted through the insertion holes 4d on the supplemental crank web 4, into the aligned five screw holes 3d on the main crank web body 3. The screws 5 are then screwed into the screw holes 3d, so that the supplemental crank web 4 is rigidly secured to the main crank web body 3.

The wider developed portion 3b of the main crank web body 3 and the developed portion 4b of the supplemental crank web 4, together with the five hexagon socket head screws 5, constitute the counterweight C4 of the crank web W4b.

An outer diameter d2 of the crank web W3b located on the other side of the primary drive gear 2 is larger than the tooth-bottom diameter D2 of the primary drive gear 2 and smaller than the outside diameter D1, as in the case of the outer diameter d1 of the main crank web body 3, that is, in the relation of D2<d2<D1.

As described above, the crank web W4b is divided into the main crank web body 3 and the supplemental crank web 4, and thus the supplemental crank web 4 may be mounted on the crankshaft body after grinding the helical teeth h with a cutting machine, on a helix angle of about 30 degrees on the outer peripheral surface of the integrally formed crank web W4a.

When grinding the gear teeth of the primary drive gear 2, even though the outer diameters d1, d2 of the main crank web body 3 and the crank web W3b adjacent to the primary drive gear 2 on both sides are larger than the bottom diameter 02 of the ground teeth, since the helical teeth h of a helix angle of 30 degrees are ground, interference of the tangential line of the bottom of the teeth skewed by the helix angle and extending in the direction of tooth trace with the main crank web body 3 and the crank web W3b may be avoided, and thus the helical teeth h can be ground.

By combining the supplemental crank web 4 with the main crank web body 3 to configure the crank web W4b as described above, after grinding the helical teeth h and forming the helical gear, the counterweight C4 may be obtained, having a sufficient weight provided by the developed portion 4b of the supplemental crank web 4.

As described above, by employing a helical gear as the primary drive gear 2, it is not necessary to set the outer diameters d1, d2 of the main crank web body 3 and the crank web W3b on both sides thereof to values smaller than the bottom diameter of the helical gear.

Since the diameter of the main crank web body 3 of the split-type crank web W4b may be increased, a sufficient counterweight can be obtained even when the supplemental crank web 4 is downsized.

In addition, by downsizing the supplemental crank web 4, the size of the hexagon socket head screw 5 for mounting to the main crank web body 3 may be reduced.

In this manner, since the outer diameter d1 of the main crank web body 3 of the split-type crank web W4b may be set to a value larger than the bottom-tooth diameter D2 of the primary drive gear 2, adjustment of the supplemental crank web 4 can be made easily, and the adaptability of the crankshaft 1 increases.

By employing a helical gear as the primary drive gear 2, the intermeshing rate with the primary driven gear on the transmission may be increased to reduce variations of load exerted to each tooth, so that mechanical noise is reduced, and quiet and smooth transmission is achieved.

Although the monolithic integrally-cast crankshaft has been described in connection with the first embodiment, in the case of the assembly type crankshaft in which parts are assembled with each other by press-fitting or the like, it is easy to form a drive gear on the crank web, and by employing a helical gear as the drive gear, mechanical noise may be reduced, and quiet and smooth transmission may be achieved.

Second Embodiment

A second embodiment of a crankshaft 12 according to the present invention is depicted in FIGS. 6–9.

The engine 11 depicted in FIG. 6 includes a crankshaft 12, a crankcase 15 rotatably supporting crank journals 13a–13e located at a plurality of or, more specifically, five positions of the crankshaft 12 by crank journal bearings 14a–14e located at a plurality of or, more specifically, five positions. The engine 11 illustrated in FIG. 6 also includes four pistons 19a–19d connected to crankpins 17a–17d at four positions on the crankshaft 12 via four connecting rods 18a–18d, respectively. The engine 11 further includes a cylinder block 21 mounted on the upper side of the crankcase 15, for guiding sliding motion of the respective pistons 19 on the inner surfaces 20a to 20d of respective cylinders, and a cylinder head 22 mounted on the upper side of the cylinder block 21 for holding a valve mechanism (not shown).

The engine 11 is provided with an associated transmission 25, and the power output from the engine is transmitted to the transmission via a primary drive gear 24 of the crankshaft 12. A clutch 26 is provided between the engine and transmission, for switching between transmitting a drive force from the crankshaft 12 to the transmission 25, and disconnecting the drive force from the transmission 25.

Figure 7:
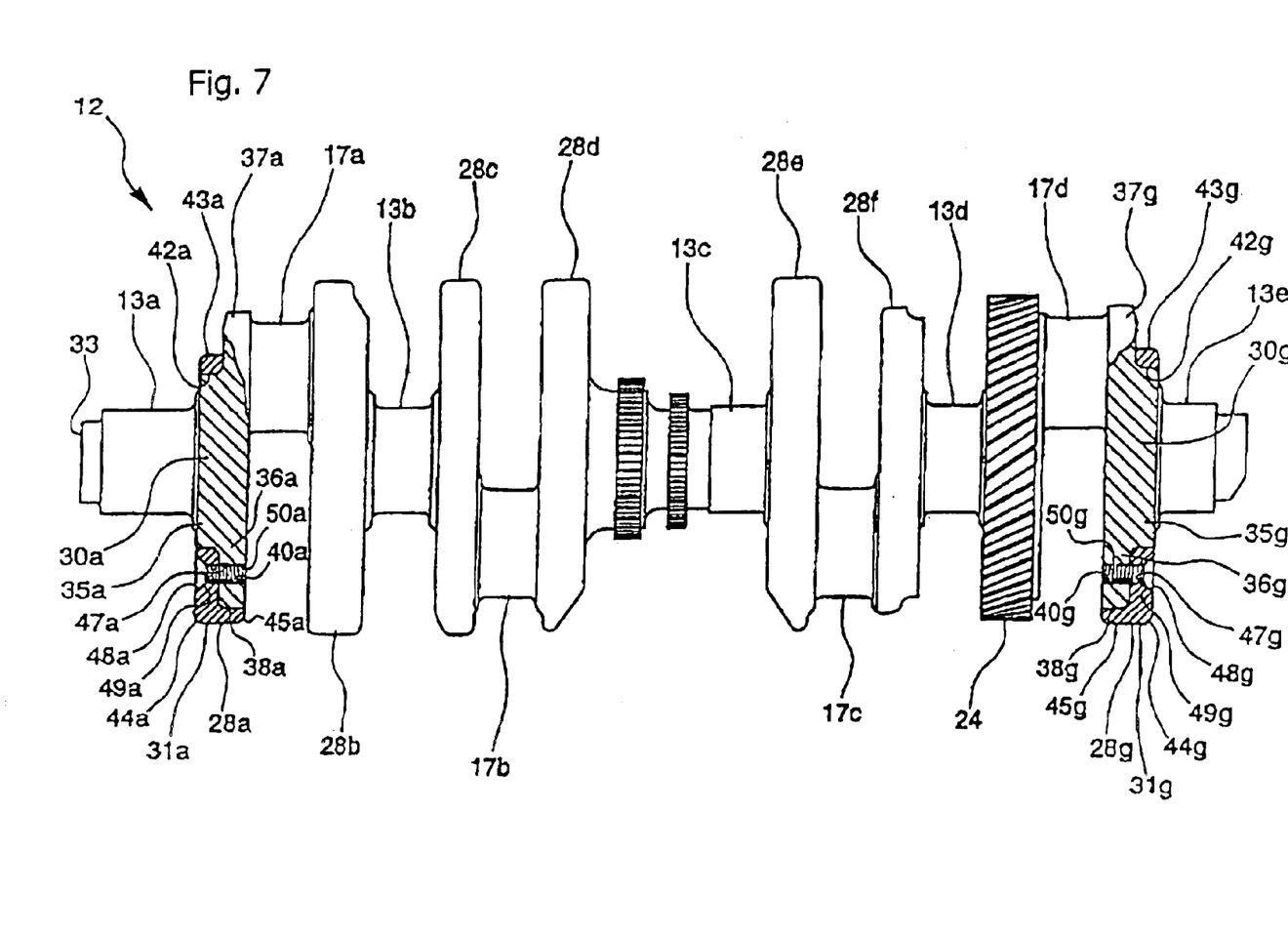
FIG. 7 is a front view of a crankshaft according to a second embodiment of the invention.

As shown in FIG. 7, the crankshaft 12 according to the first embodiment includes, from the left side in the drawing, moving left-to-right in an axial direction, the crank journal 13a, a crank web 28a, the crankpin 17a, a crank web 28b, the crank journal 13b, a crank web 28c, the crankpin 17b, a crank web 28d, the crank journal 13c, a crank web 28e, the crankpin 17c, a crank web 28f, the crank journal 13d, the primary drive gear 24 (gear), the crankpin 17d, a crank web 28g, and the crank journal 13e.

The crankshaft 12 is rotatably supported by the crank journal bearings 14a to 14e of the crankcase 15 shown in FIG. 6 at the crank journals 13a to 13e provided coaxially, and rotatably supports the connecting rods 18a to 18d on the respective crankpins 17a to 17d radially shifted with respect to the crank journals 13a to 13e. Here, the crankpins 17a, 17d on both outer sides of the crankshaft 12 in the axial direction are phased with respect to each other in the direction of rotation of the crankshaft 12, and the crankpins 17b, 17c located on both inner sides of the crankshaft 12 in the axial direction are also phased with respect to each other in the direction of rotation of the crankshaft 12. The relative positions of both of the inner crankpins 17b, 17c are shifted 180 degrees in relation to the outer crankpins 17a, 17d.

Figure 8:
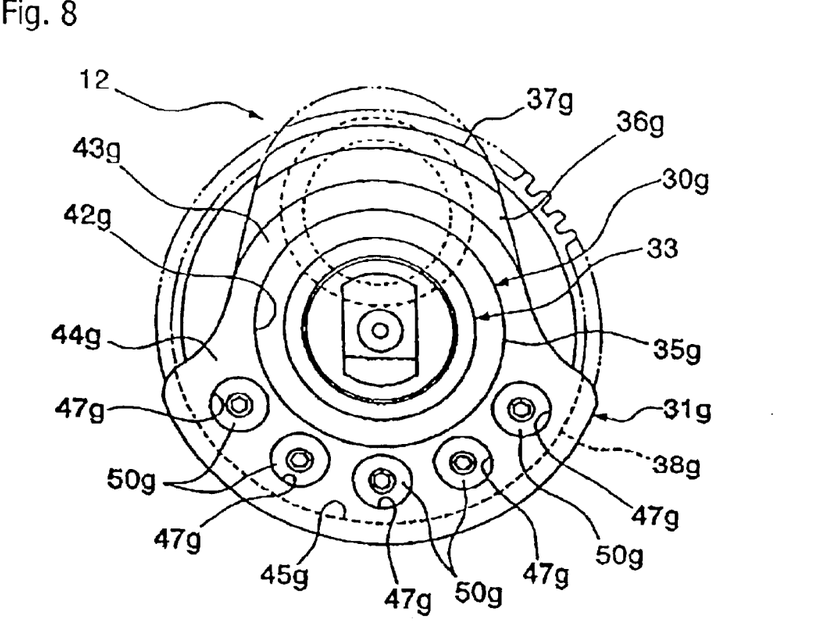
FIG. 8 is a side plan view of the crankshaft according to the second embodiment of the invention, viewed from a vantage point on the right side of FIG. 7.
Figure 9:
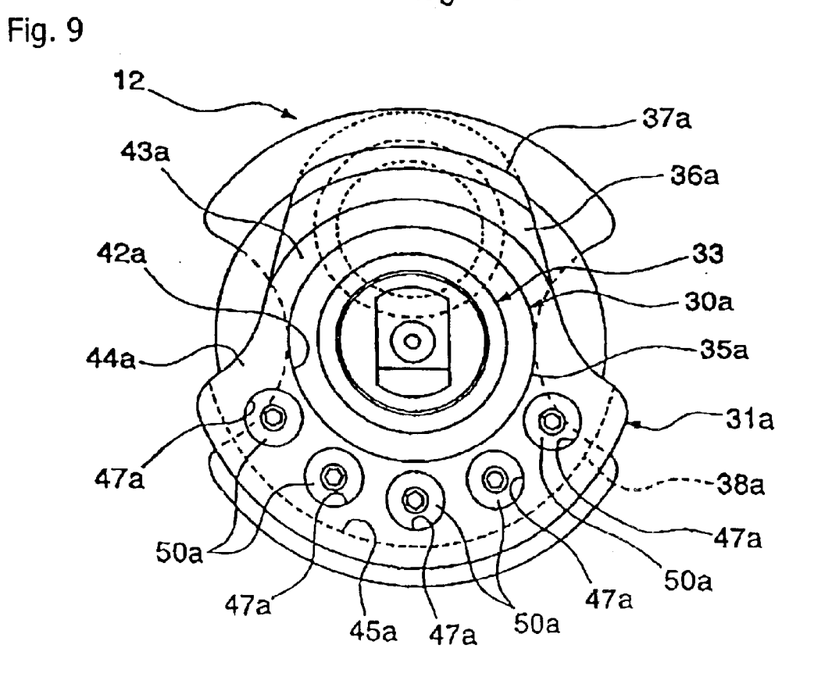
FIG. 9 is a side plan view of the crankshaft according to the second embodiment of the invention, viewed from a vantage point on the left side of FIG. 7.

The crank web 28g is located on the outside of the crankpin 17d at one end out of the plurality of crankpins 17a–17d and located on the opposite side of the crankpin 17d from the primary drive gear 24. As shown in FIG. 7 and FIG. 8, the crank web 28 includes a first balance weight mounting portion (balance weight mounting portion) 30g and a first balance weight (balance weight) 31g. The crank web 28a on the outside of the crankpin 17a on the other side out of the plurality of crankpins 17a to 17d also includes, as shown in FIG. 7 and FIG. 9, a second balance weight mounting portion 30a and a second balance weight 31a.

The crank journals 13a to 13e described above, the crank webs 28b to 28f, the crankpins 17a to 17d and the first and second balance weight mounting portions 30a, 30g are formed on an integrally formed crankshaft body 33.

The first balance weight mounting portion 30g on one side includes a narrowed fitting column 35g provided on the outside of the crankshaft 12 in the axial direction, and a widened base member 36g located inside, that is, on the side of the adjacent crankpin 17d and being extended radially outwardly from the fitting column 35g.

The base member 36g is formed into a shape in which one side half radially of the crankshaft 12 is gradually tapered toward the distal end in the radial direction. The outer peripheral portion is formed with a narrowed extension 37g forming an arc which is coaxial with the crank journals 13a to 13e, and the other side half thereof radially of the crankshaft 12 has a shape gradually increasing in width toward the distal end in the radial direction. The outer peripheral portion is a widened extension 38g forming an arc which is coaxial with the crank journals 13a to 13e. Here, the widened extension 38g is formed on the opposite side of the adjacent crankpin 17d with respect to the center axis of the crank journals 13a to 13e.

The outer diameters of the distal ends of the narrowed extension 37g and the widened extension 38g, which are the largest outer diameter at the first balance weight mounting portion 30g, are the same, and these outer diameters are set to a value which does not interfere with a hob cutter or the like, which is a machining tool used when machining the primary drive gear 24 disposed adjacent via the crankpin 17d. The primary drive gear 24 here is a helical gear.

The base member 36g of the first balance weight mounting portion 30g is formed with screw holes 40g in the axial direction of the crankshaft 12 at a plurality of or, more specifically, five positions (only one position is shown in FIG. 2) on the widened extension 38g arranged at predetermined pitches in an arcuate shape.

The first balance weight 31g held by the first balance weight mounting portion 30g is formed at the center with a fitting hole 42g to be fitted with the fitting column 35g of the first balance weight mounting portion 30g after the crank journal 13e on the outer side in the axial direction of the crankshaft 12 is passed through. The first balance weight 31g also includes a semi-circular portion 43g forming part of a ring shape on one side half of the fitting hole 42g in the radial direction, and a weight portion 44g widening radially outwardly and gradually increasing in width toward the distal end in the radial direction on the other half thereof so as to be heavier than the semi-circular portion 43g and forming an arc at the distal end which is coaxial with the crank journals 13a to 13e.

The first balance weight 31g is also formed at the arcuate end edge of the weight portion 44g thereof on the outer diameter side with an arcuate projection 45g having an arc shape along the end edge thereof and projecting on one side in the axial direction, so that the base member 36g is fitted to the arcuate projection 45g while fitting the fitting column 35g in the fitting hole 42g. The weight portion 44g is formed with mounting holes 47g along the axial direction of the crankshaft 12 at a plurality of or, more specifically, five positions arranged in an arcuate shape at the same pitches as the screw holes 40g described above. Here, each mounting hole 47g has a conical surface 48g on the side opposite from the projecting side of the arcuate projection 45g.

The first balance weight 30g is fixed to the first balance weight mounting portion 30g by fitting the widened extension 38g of the base member 36g of the first balance weight mounting portion 30g to the arcuate projection 45g while fitting the fitting column 35g of the first balance weight mounting portion 30g to the fitting hole 42g from the outside in the axial direction of the crankshaft 12, and in a state in which the end surface is abutted against the end surface of the base member 36g, inserting respective screws 50g each having a conical surface 49g into the respective mounting holes 47g and screwing them into the screw holes 40g. In this state, the weight portion 44g of the first balance weight 31g is positioned on the opposite side of the adjacent crankpin 17d with respect to the center axis of the crank journals 13a to 13e.

The other balance weight mounting portion 30a includes a fitting column 35a being coaxial with the crank journals 13a to 13e and provided on the outside in the axial direction of the crankshaft 12, that is, on the side of the adjacent crank journal 13a, and a base member 36a located on the inner side, that is, on the side of the adjacent crankpin 17a, and extending radially outwardly from the fitting column 35a. The base member 36a is formed into a shape in which one side half radially of the crankshaft 12 is gradually tapered toward the distal end in the radial direction, and the outer peripheral portion is formed with a narrowed extension 37a forming an arc which is coaxial with the crank journals 13a to 13e. The other side half thereof radially of the crankshaft 12 has a shape gradually increasing in width toward the distal end in the radial direction, and the outer peripheral portion is a widened extension 38a forming an arc which is coaxial with the crank journals 13a to 13e. Here, the widened extension 38a is formed on the opposite side of the adjacent crankpin 17a with respect to the center axis of the crank journals 13a to 13e.

The outer diameters of the distal ends of the narrowed extension 37a and the widened extension 38a, which are the largest outer diameter at the first balance weight mounting portion 30a, are the same, and they are the same as the outer diameter of the distal ends of the narrowed extension 37g and the widened extension 38g of the first balance weight mounting portion 30g described above.

The base member 36a of the first balance weight mounting portion 30a is formed with a plurality of screw holes 40a along the axial direction of the crankshaft 12 on the widened extension 38a arranged at predetermined pitches in an arcuate shape, in the same manner as the screw holes 40g of the first balance weight mounting portion 30g described above.

The first balance weight 31a held by the first balance weight mounting portion 30a is formed at the center with a fitting hole 42a to be fitted with the fitting column 35a of the first balance weight mounting portion 30a after the crank journal 13a on the outer side is passed through, and includes a semi-annual portion 43a forming part of a ring shape on one side half of the fitting hole 42a in the radial direction, and a weight portion 44a widening radially outwardly and gradually increasing in width toward the distal end in the radial direction on the other side half thereof so as to be heavier than the semi-annular portion 43a and forming an arc at the distal end which is coaxial with the crank journals 13a to 13e.

The first balance weight 31a is also formed at the arcuate end edge of the weight portion 44a thereof on the outer diameter side with an arcuate projection 45a having an arc shape along the end edge thereof and projecting on one side in the axial direction, so that the base member 36a is fitted to the arcuate projection 45a while fitting the fitting column 35a in the fitting hole 42a. The weight portion 44a is formed with mounting holes 47a along the axial direction of the crankshaft 12 at a plurality or or, more specifically, five positions arranged in an arcuate shape at the same pitches as the screw holes 40a described above. Here, each mounting hole 47g has a conical surface 48a on the side opposite from the projecting side of the arcuate projection 45a.

The first balance weight 31a is fixed to the first balance weight mounting portion 30a by fitting the widened extension 38a of the base member 36a of the first balance weight mounting portion 30a to the arcuate projection 45a while fitting the fitting column 35a of the first balance weight mounting portion 30a to the fitting hole 42a from the outside in the axial direction of the crankshaft 12, and in a state in which the end surface is abutted against the end surface of the base member 36a, inserting respective screws 50a each having a conical surface 49a into the respective mounting holes 47a and screwing them into the screw holes 40a. In this state, the weight portion 44a of the first balance weight 31a is positioned on the opposite side of the adjacent crankpin 17a with respect to the center axis of the crank journals 13a to 13e.

In the arrangement described above, according to the embodiment, the crank shaft body 33 of the crankshaft 12 is formed with the primary drive gear 24 for outputting rotation on one side of the crankpin 17d for supporting the connecting rod 18d connected to the piston 19d, and the first balance weight mounting portion 30g to which the separate balance weight 31g is mounted on the other side of the crankpin 17d, and in addition, the first balance weight mounting portion 30a to which the separate balance weight 31a is mounted separately from the first balance weight mounting portion 30g. In addition, the first balance weight mounting portion 30g on one side is provided on the outside of the crankpin 17d located at one end out of the plurality of crankpins 17a to 17d, and the other balance weight mounting portion 30a is provided on the outside of the crankpins 17a.

According to the crankshaft 12 according to the embodiment described above, using the structure in which the crank web 28g provided in the vicinity of the primary drive gear 24 is divided into the first balance weight mounting portion 30g and the first balance weight 31g in order to perform machining of the gear of the primary drive gear 24 while avoiding interference with the gear machining tool such as a hob cutter, for example, for a plurality of engine types having different properties, the first balance weight 31g to be mounted to the first balance weight mounting portion 30g is changed to adjust the inertia moment, and the second balance weight 31a to be provided on the separate balance weight mounting portion 30a is also changed for balancing the crankshaft 12 in the axial direction. Accordingly, the inertia moment can be changed only by changing the first balance weights 31a, 31g, and the crankshaft body 33 excluding the first balance weights 31a, 31g may be shared among a plurality of engines, and thus significant cost reduction is achieved.

Since the first balance weight mounting portion 31g on one side is provided on the outside of the crankpin 17d located at one end out of a plurality of crankpins 17a to 17d, and the other balance weight mounting portion 30a is provided on the outside of the crankpin 17a located at the other end, the first balance weight mounting portion 30a and the first balance weight mounting portion 30g are well balanced in terms of position, and thus when changing the first balance weights 31a, 31g, the first balance weights 31a, 31g can be set relatively easily.

In addition, by employing the helical gear as the primary drive gear 24, meshing noise of the primary drive gear 24 can be reduced, and hence quietness may be improved. However, since it is necessary to incline the gear machining tool such as the hob cutter with respect to the primary drive gear 24 for machining the helical gear, and hence probability of interference with the crank web 28g which is located on the opposite side of the crankpin 17d from the primary drive gear 24 increases, the structure in which the crank web 28g is divided into the first balance weight mounting portion 30g and the first balance weight 31g as described above is further effective.

In view of adjustment of the inertia moment, it is also possible to form the first balance weight 31a and the first balance weight 31g in the same shape, or in different shapes.

According to one aspect of the invention, utilizing the structure in which the crank web is divided into the first balance weight for machining the gear while avoiding interference with the machining tool, for example, for a plurality of engine types having different properties, the first balance weight to be mounted to the first balance weight mounting portion is changed to adjust the inertia moment, and the second balance weight to be provided on the separate second balance weight mounting portion is also changed for balancing the crankshaft in the axial direction. Accordingly, the inertia moment can be changed only by changing the first balance weight and the second balance weight and the crankshaft can be mounted to the plurality of engine types. Therefore, the crankshaft body excluding the first balance weight and the second balance weight may be shared among a plurality of engines, and thus significant cost savings are achieved.

According to another aspect of the invention, since the first balance weight mounting portion is provided on the outside of the crankpin located at one end out of a plurality of crankpins, and the second balance weight mounting portion is provided on the outside of the crankpin located at the other end, the first balance weight mounting portion and the second balance weight mounting portion are well balanced in terms of position, and thus when changing the first balance weight and the second balance weight, they can be set relatively easily.

According to a further aspect of the invention, although meshing noise of the gear can be reduced, and hence quietness may be improved by employing the helical gear as the gear, since it is necessary to incline the machining tool with respect to the gear for machining the helical gear, and hence probability of interference with the crank web which is located on the opposite side of the crankpin from the gear increases, the structure in which the crank web is divided into the first balance weight mounting portion and the first balance weight as described above is further effective.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

What is claimed is:

1. A crankshaft for use as a component of an internal combustion engine and for converting reciprocating motion of pistons in the internal combustion engine to rotary motion, said crankshaft comprising:
    a plurality of interconnected crank webs;
    wherein one of said crank webs forms a primary drive gear, which is a helical gear; and wherein another one of said crank webs comprises a split crank web which is connected to the primary drive gear via a crankpin;
    wherein the split crank web comprises a main crank web portion integrally formed with the crankpin, and a supplemental balance weight which is removable from the main crank web, and wherein the supplemental balance weight has a cylindrical hole formed therein to receive a portion of the crankshaft body.

2. A crankshaft for an internal combustion engine according to claim 1, wherein the helical gear is integrally formed with the crank web by grinding helical teeth along the periphery of the crank web.

3. The crankshaft of claim 1, wherein the diameter of the main crank web portion is larger than the diameter of the primary drive gear at the base of the teeth thereof.

4. A crankshaft for use as a component of an internal combustion engine, said crankshaft comprising a crankshaft body comprising:
    a first crankpin;
    a gear formed on a first crank web located at one side of the first crankpin;
    a first balance weight mounting portion formed on a second crank web located at the other side of the first crankpin;
said crankshaft further comprising a first balance weight mounted to the first balance weight mounting portion of the crankshaft body so as to be selectively detachable; wherein the crankshaft body is formed with a second balance weight mounting portion separate from the first balance weight mounting portion, and wherein said crankshaft also comprises a second balance weight removably attached to the second balance weight mounting portion, and
    wherein the second crank web is situated between the first balance weight and the gear.

5. A crankshaft according to claim 4, wherein the first balance weight has a first mass, and wherein the second balance weight has a mass substantially equal to the first mass.

6. A crankshaft according to claim 4, wherein the first balance weight mounting portion is provided on the outside of said crankpin which is located at one end out of a plurality of crankpins, and wherein the second balance weight mounting portion is provided on the outside of a crankpin located at the other end of said plurality of crankpins.

7. A crankshaft according to claim 4, wherein the gear is a helical gear.

8. A crankshaft for use as a component of an internal combustion engine, said crankshaft comprising a crankshaft body which comprises:
    a plurality of journals situated along a longitudinal axis of said crankshaft;
    a plurality of crank pins displaced from said longitudinal axis;
    a plurality of crank webs interconnecting said crank pins with said journals;
    wherein one of said crank webs is configured as a helical gear with teeth formed externally thereon;
    and further wherein one of said crank webs is formed in two parts including a first balance weight mounting portion and a first supplemental balance weight which abuts against and is removably attached to a side surface of the first balance weight mounting portion.

9. The crankshaft of claim 8, wherein another of said crank webs is formed in two parts including a second balance weight mounting portion and a second supplemental balance weight which is removably attached to the second balance weight mounting portion.

10. The crankshaft of claim 8, wherein said two-part crank web is disposed at a first end of said crankshaft.

11. The crankshaft of claim 8, wherein said supplemental balance weight is attached to the balance weight mounting portion using a plurality of fasteners.

12. A crankshaft for use as a component of an internal combustion engine, said crankshaft comprising a crankshaft body which comprises:
    a plurality of journals situated along a longitudinal axis of said crankshaft, a plurality of crank pins displaced from said longitudinal axis;

a plurality of crank webs interconnecting said crank pins with said journals;

wherein one of said crank webs is configured as a helical gear with teeth formed externally thereon;

and further wherein one of said crank webs is formed in two parts including a first balance weight mounting portion and a first supplemental balance weight which is removably attached to the first balance weight mounting portion, and wherein the first supplemental balance weight includes a body portion and a flange which extends away from the body portion proximate an edge portion thereof.

13. A crankshaft for use as a component of an internal combustion engine, said crankshaft comprising a crankshaft body which comprises:

a plurality of journals situated along a longitudinal axis of said crankshaft;

a plurality of crank pins displaced from said longitudinal axis;

a plurality of crank webs interconnecting said crank pins with said journals;

wherein one of said crank webs is configured as a helical gear with teeth formed externally thereon;

and further wherein one of said crank webs is formed in two parts including a first balance weight mounting portion and a first supplemental balance weight which is removably attached to the first balance weight mounting portion, and wherein the supplemental balance weight has a cylindrical hole formed therein to receive a portion of the crankshaft body.

14. A crankshaft for use as a component of an internal combustion engine, said crankshaft comprising a crankshaft body which comprises:

a plurality of journals situated along a longitudinal axis of said crankshaft;

a plurality of crank pins displaced from said longitudinal axis;

a plurality of crank webs interconnecting said crank pins with said journals;

wherein one of said crank webs is configured as a helical gear with teeth formed externally thereon;

and further wherein one of said crank webs is formed in two parts including a first balance weight mounting portion and a first supplemental balance weight which is removably attached to the first balance weight mounting portion, and wherein the supplemental balance weight has a plurality of mounting holes formed therein to receive fasteners, and wherein the mounting holes include recessed portions to receive fastener heads therein.

* * * * *